US010391791B2

(12) United States Patent
Kodama et al.

(10) Patent No.: US 10,391,791 B2
(45) Date of Patent: Aug. 27, 2019

(54) MEDIUM TRANSPORT UNIT, RECORDING APPARATUS, AND IMAGE READING APPARATUS

(71) Applicant: SEIKO EPSON CORPORATION, Tokyo (JP)

(72) Inventors: Hidetoshi Kodama, Matsumoto (JP); Yuichi Segawa, Shiojiri (JP); Kazuyoshi Ohashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/828,048

(22) Filed: Nov. 30, 2017

(65) Prior Publication Data

US 2018/0079229 A1 Mar. 22, 2018

Related U.S. Application Data

(63) Continuation of application No. 15/237,366, filed on Aug. 15, 2016, now Pat. No. 9,855,770, which is a (Continued)

(30) Foreign Application Priority Data

Oct. 24, 2014 (JP) ................................ 2014-217046
Mar. 27, 2015 (JP) ................................ 2015-065903

(51) Int. Cl.
*G03G 15/00* (2006.01)
*B65H 15/00* (2006.01)
(Continued)

(52) U.S. Cl.
CPC .......... *B41J 11/0045* (2013.01); *B65H 15/00* (2013.01); *B65H 29/125* (2013.01);
(Continued)

(58) Field of Classification Search
CPC combination set(s) only.
See application file for complete search history.

(56) References Cited

U.S. PATENT DOCUMENTS 3,944,212 A 3/1976 Stange
4,385,825 A 5/1983 Kaneko
(Continued)

FOREIGN PATENT DOCUMENTS

JP 09012198 1/1997
JP 09086759 3/1997
JP 2011-105395 A 6/2011

*Primary Examiner* — Nguyen Q. Ha
(74) *Attorney, Agent, or Firm* — Workman Nydegger

(57) ABSTRACT

A medium transport unit includes an upstream route in which a print sheet is transported, a first switchback route, a second switchback route, a first guide route, a second guide route, a guide flap configured to switch the route so that the print sheet in the upstream route is transported either toward the first guide route or toward the second guide route, a first discharge route from which the print sheet in the first switchback route is discharged, a second discharge route from which the print sheet in the second switchback route is discharged, and a downstream route passing between the first switchback route and the second switchback route and having an upstream end connected to a junction of downstream ends of the first discharge route and the second discharge route.

8 Claims, 8 Drawing Sheets

Related U.S. Application Data continuation of application No. 14/920,639, filed on Oct. 22, 2015, now Pat. No. 9,442,448.

(51) Int. Cl.

| | |
|---|---|
| ***B65H 29/00*** | (2006.01) |
| ***B41J 11/00*** | (2006.01) |
| ***B65H 29/60*** | (2006.01) |
| ***H04N 1/00*** | (2006.01) |
| ***B65H 29/12*** | (2006.01) |
| ***B65H 43/00*** | (2006.01) |

(52) U.S. Cl.

CPC ............ *B65H 29/60* (2013.01); *B65H 43/00* (2013.01); *G03G 15/6529* (2013.01); *H04N 1/0057* (2013.01); *H04N 1/00795* (2013.01); *B65H 2301/323* (2013.01); *B65H 2301/33312* (2013.01); *B65H 2404/631* (2013.01); *B65H 2404/632* (2013.01); *B65H 2601/523* (2013.01); *B65H 2801/27* (2013.01); *B65H 2801/39* (2013.01); *G03G 2215/007* (2013.01); *G03G 2215/00675* (2013.01); *G03G 2215/00679* (2013.01)

(56) References Cited

U.S. PATENT DOCUMENTS

| | | | | |
|---|---|---|---|---|
| 4,579,446 | A | 4/1986 | Fujino et al. | |
| 4,874,958 | A | 10/1989 | Sampath et al. | |
| 4,986,529 | A | 1/1991 | Agarwal et al. | |
| 5,504,568 | A * | 4/1996 | Saraswat | G03G 15/01 358/1.12 |
| 5,604,577 | A | 2/1997 | Wakuda et al. | |
| 5,669,056 | A | 9/1997 | Rubscha | |
| 7,859,728 | B2 * | 12/2010 | Yun | G03G 15/23 358/474 |
| 8,459,644 | B1 | 6/2013 | Thompson et al. | |
| 9,442,448 | B2 | 9/2016 | Kodama et al. | |
| 2002/0067945 | A1 | 6/2002 | Kelley et al. | |
| 2003/0063936 | A1 | 4/2003 | Sasaki et al. | |
| 2003/0190179 | A1 | 10/2003 | Kinoshita et al. | |
| 2006/0176352 | A1 | 8/2006 | Mihara et al. | |
| 2009/0127775 | A1 | 5/2009 | Takahashi et al. | |
| 2010/0244354 | A1 | 9/2010 | Suh et al. | |
| 2011/0109038 | A1 | 5/2011 | Nishizawa et al. | |
| 2013/0335762 | A1 | 12/2013 | Van Gasse et al. | |
| 2015/0005925 | A1 | 1/2015 | Ogawa et al. | |
| 2016/0347090 | A1 | 12/2016 | Kodama et al. | |

* cited by examiner

MEDIUM TRANSPORT UNIT, RECORDING APPARATUS, AND IMAGE READING APPARATUS

BACKGROUND

1. Technical Field

The present invention relates to a medium transport unit configured to transport a medium such as a print sheet, a recording apparatus provided with the medium transport unit, and an image reading apparatus provided with the medium transport unit.

2. Related Art

Examples of an image forming apparatus (recording apparatus) provided with a paper reversing apparatus (medium transport unit) configured to reverse and transport a print sheet (medium) in the related art include a configuration, for example, disclosed in JP-A-9-12198. The paper reversing apparatus provided in the image forming apparatus as described above is configured to reverse the print sheet with a switchback mechanism.

In other words, the paper reversing apparatus includes a first reversing paper guide and a second reversing paper guide arranged with a partitioning plate interposed there between, and a third paper transporting channel and a fourth paper transporting channel extending respectively from the first reversing paper guide and the second reversing paper guide respectively, joining together at downstream ends thereof, and connected to an upstream end of a downstream side transporting channel.

When print sheets are fed to the first reversing paper guide and the second reversing paper guide alternately from an upstream side transporting channel, the print sheets fed to the first reversing paper guide are reversed in the course of being transported in the third paper transporting channel and are fed to the downstream side transporting channel. In contrast, the print sheets fed to the second reversing paper guide are reversed in the course of being transported in the fourth paper transporting channel and are fed to the downstream side transporting channel.

The paper reversing apparatus as described above is configured in such a manner that the third paper transporting channel and the fourth paper transporting channel pass outside the first reversing paper guide and the second reversing paper guide, respectively. Therefore, four routes including the first reversing paper guide, the second reversing paper guide, the third paper transporting channel, and the fourth paper transporting channel are arranged side by side. Therefore, there arises a problem of an increase in size of the apparatus.

SUMMARY

An advantage of some aspect of the invention is to provide a medium transport unit, a recording apparatus, and an image reading apparatus which can be reduced in size.

The invention provides a medium transport unit including: an upstream route in which a medium is transported; a first switchback route arranged on the downstream side of the upstream route; a second switchback route arranged on the downstream side of the upstream route; a first guide route configured to guide the medium in the upstream route to the first switchback route; a second guide route configured to guide the medium in the upstream route to the second switchback route; a guide switch unit configured to selectively switch the route so that the medium transported through the upstream route is transported to one of the first guide route and the second guide route; a first discharge route configured to discharge the medium from the first switchback route; a second discharge route configured to discharge the medium from the second switchback route; and a downstream route passing between the first switchback route and the second switchback route and having an upstream end connected to a junction of downstream ends of the first discharge route and the second discharge route.

In this configuration, the routes arranged side by side are composed of three routes including the first switchback route, the second switchback route, and the downstream route, so that a reduction in size of the apparatus is enabled.

In the medium transport unit, preferably, at least one of a condition that a length of the first discharge route is shorter than a length of the first switchback route and a condition that a length of the second discharge route is shorter than the second switchback route is satisfied.

In this configuration, since at least one of the length of the first discharge route and the length of the second discharge route can be reduced, the reduction in size of the apparatus is enabled.

In the medium transport unit, preferably, at least one of a condition that a length of the first guide route is shorter than a length of the first switchback route and a condition that a length of the second guide route is shorter than the second switchback route is satisfied.

In this configuration, since the length of at least one of the first guide route and the second guide route can be reduced, the reduction in size of the apparatus is enabled.

Preferably, the medium transport unit further includes a skip route diverged from a midpoint of the upstream route and join to a midpoint of the downstream route to guide the medium in the upstream route to the downstream route without passing through the first guide route and the second guide route; and a skip switching unit configured to selectively switch the route of the medium in the upstream route so as to be transported toward one of a downstream end and the skip route of the upstream route.

In this configuration, by switching the skip switching unit to the skip route side, the medium in the upstream route can be rapidly transported to the downstream route without passing through the first guide route and the second guide route.

Preferably, in the medium transport unit, further includes an intermediate route connecting the downstream end of the upstream route and the upstream end of the downstream route, and the guide switch unit selectively switches the route so that the medium transported through the upstream route is transported to one of the first guide route, the second guide route, and the intermediate route.

In this configuration, by switching the guide switch unit to the intermediate route side, the medium in the upstream route can be rapidly transported to the upstream end of the downstream route through the intermediate route without passing through the first guide route and the second guide route.

Another advantage of some aspect of the invention is to provide a recording apparatus of the invention includes a recording unit configured to perform recording on a medium, and a post-processing unit configured to perform post-processing on the medium on which recording is performed by the recording unit, wherein the recording unit and the post-processing unit are coupled by the medium transport unit.

In this configuration, a medium on which the recording is performed by the recording unit is transported by the medium transporting unit, and is subjected to post-processing by the post-processing unit.

In the recording apparatus described above, the first switchback route and the second switchback route are each configured to be capable of receiving a medium having a maximum recordable size for the recording unit.

In this configuration, the medium having the maximum recordable size for the recording unit can be received by the first switchback route and the second switchback route.

Further advantage of some aspects of the invention is to provide the invention provides an image reading apparatus including: a reader configured to read an image on a medium; and the medium transporting unit described above, wherein the first switchback route and the second switchback route are each configured to be capable of receiving the medium having a maximum readable size for the reader.

In this configuration, the medium having the maximum readable size for the reader can be received by the first switchback route and the second switchback route.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of a recording apparatus will be described below with reference to the drawings.

Figure 1:
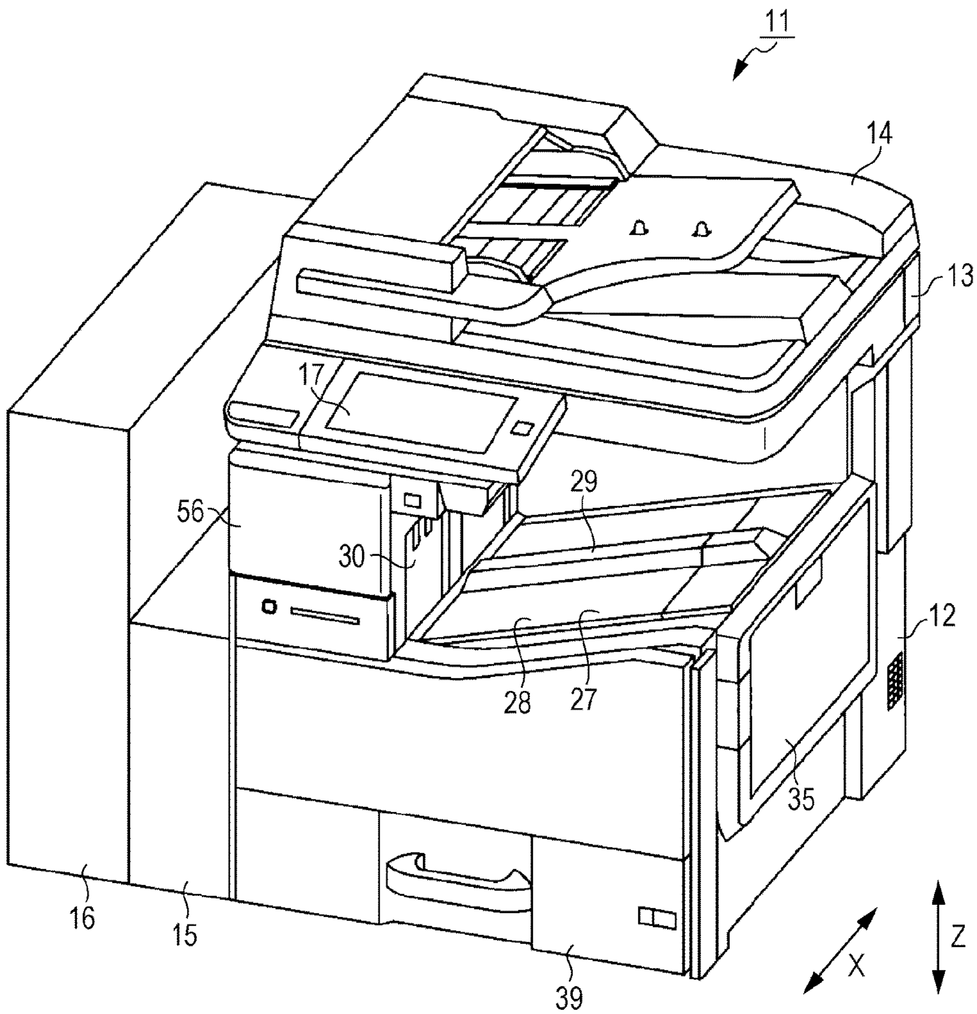
FIG. 1 is a perspective view of a recording apparatus of an embodiment.

As illustrated in FIG. 1, a recording apparatus 11 includes a printer unit 12 as a recording unit, a scanner unit 13 arranged on the printer unit 12, an automatic paper-feeding apparatus 14 arranged on the scanner unit 13, a medium transport unit 15 arranged on a side portion of the printer unit 12, and a finisher 16 as a post-processing unit arranged in the medium transport unit 15 on a side portion opposite to the side where the printer unit 12 is provided. An operating unit 17 configured to perform various operations on the recording apparatus 11 is provided on the printer unit 12 at a position adjacent to the scanner unit 13.

Figure 2:
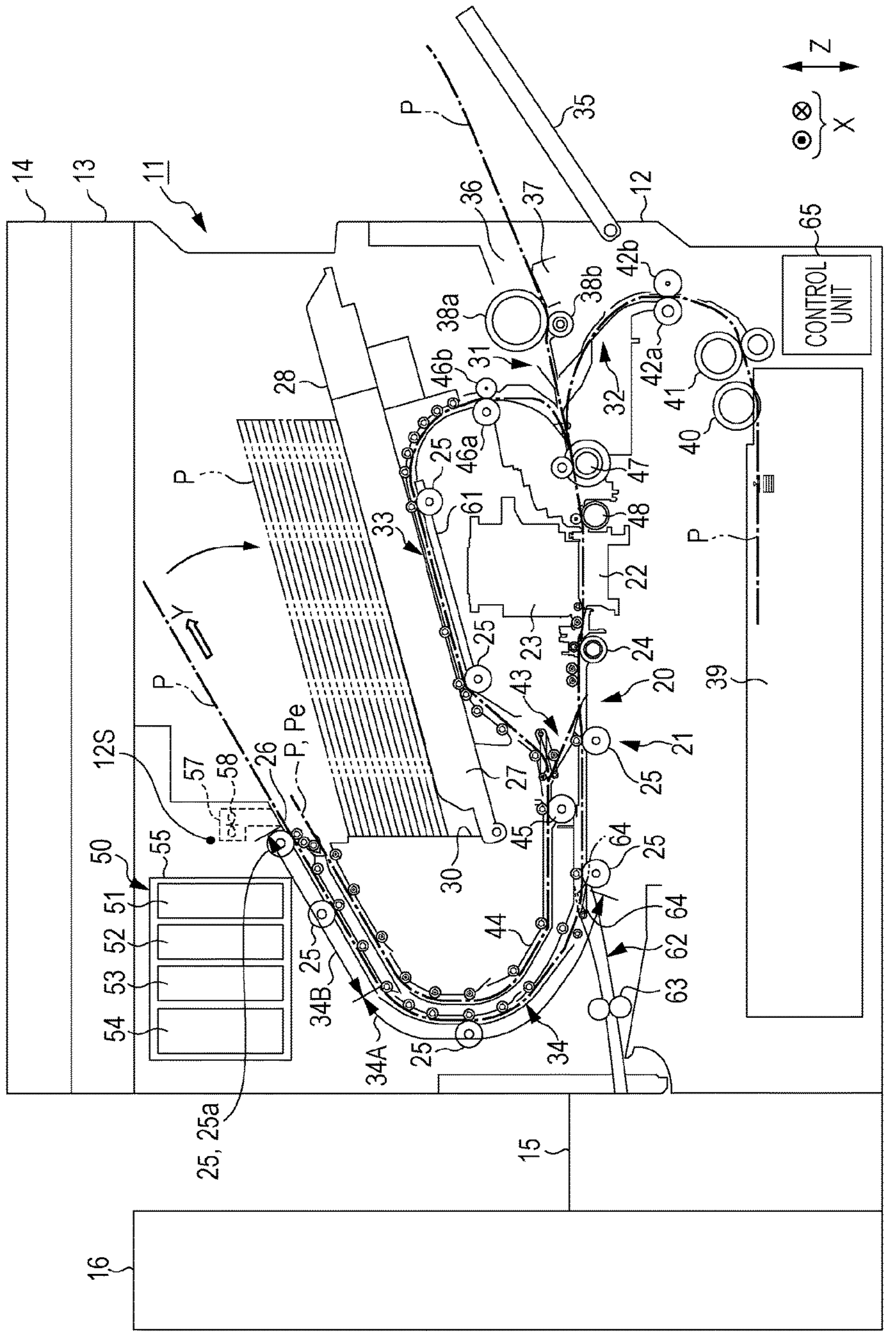
FIG. 2 is a view illustrating a structural frame format of the recording apparatus.

As illustrated in FIG. 2, the printer unit 12 includes a medium transporting channel 20 in which a print sheet P as an example of the medium is transported, and a transport unit 21 including a plurality of rollers (roller pairs) and configured to transport the print sheet P along the medium transporting channel 20. The printer unit 12 includes a supporting base 22 configured to support a print sheet P from a lower side in a vertical direction Z and a recording unit 23 configured to print (record) an image on the print sheet P supported by the supporting base 22 accommodated therein.

The printer unit 12 transports the print sheet P along the top of the supporting base 22 and the medium transporting channel 20 in an orientation that a width direction X of the print sheet P corresponds to the direction orthogonal to a paper plane of FIG. 2 and a direction intersecting the width direction X corresponds to a transporting direction. The recording unit 23 is provided with a line head as a liquid ejection head capable of ejecting ink over the substantially entire area in the width direction X which intersects the transporting direction of the print sheet P simultaneously at a lower portion thereof, and is configured to print an image by ejecting ink from an upper side in the vertical direction Z toward the print sheet P transported on the supporting base 22 and causing the ink to adhere thereto.

The printed print sheet P is transported from the recording unit 23 to the medium transport channel 20 by a paper discharge roller pair 24 and other plurality of transport roller pairs 25 and is discharged from a medium discharge port 26 provided at a downstream end of the medium transport channel 20. The print sheets P discharged from the medium discharge port 26 drop and are mounted on a mounting base 27 arranged on an upper side of the recording unit 23 in the vertical direction Z in a stacked manner as indicated by two-dot chain lines in FIG. 2. In other words, the mounting base 27 sequentially receives and supports printed print sheets P discharged and dropping from the medium discharge port 26.

As illustrated in FIG. 1 and FIG. 2, the mounting base 27 has a substantially rectangular plate shape, and is inclined so as to increase in height as it proceeds to a discharging direction Y of the print sheets P. An upper surface of the mounting base 27 corresponds to an inclined mounting surface 28, and print sheets P are mounted on the mounting surface 28. A protruding portion 29 extending in the discharging direction Y is formed on the mounting surface 28 substantially at a center in the width direction X of the print sheet P.

The print sheets P mounted on the mounting surface 28 slip downward in an opposite direction to the discharging direction Y along an inclination of the mounting surface 28 and are positioned by coming into contact at an end thereof opposite to the discharging direction Y side with a vertical side wall 30 provided on a lower side of the medium discharge port 26 of the printer unit 12 as indicated by the two-dot chain lines in FIG. 2. The discharging direction Y of the print sheet P is inclined at an angle larger than that of the mounting surface 28 with respect to a horizontal plane.

As illustrated in FIG. 2, the medium transport channel 20 in this embodiment includes a medium discharge channel 34 configured to transport the print sheet P from the recording unit 23 to the medium discharge port 26 and a medium supply channel configured to supply the print sheet P to the recording unit 23, and the medium supply channel includes a first medium supply channel 31, a second medium supply channel 32, and a third medium supply channel 33.

The medium discharge channel 34 includes a curved channel 34A and a straight channel 34B. The medium discharge channel is curved to cause the print sheet P to curve with a recording surface of the print sheet P printed by the recording unit 23 facing inward during the transport of the print sheet P printed by the recording unit 23 to the medium discharge port 26. The straight channel 34B transports the print sheet P from the curved channel 34A toward the medium discharge port 26 in one direction.

The medium discharge channel 34 functions as a curving and reversing route configured to reverse the print sheet P from a state in which the recording surface thereof faces upward to a state in which the recording surface faces downward in the vertical direction by transporting the print sheet P in the curved channel 34A and the straight channel 34B. Therefore, the print sheet P passes through the medium discharge channel 34, which functions as the curving and reversing route, whereby the recording surface thereof faces the mounting surface 28 of the mounting base 27, and the print sheet P is discharged from the medium discharge port onto the mounting base 27 located above the recording unit 23.

The transporting direction of the print sheet P, which is a direction in which the print sheet P is transported in the straight channel 34B in the medium discharge channel 34 provided in the medium transport channel 20 is one direction that the straight channel 34B has. In this embodiment, the one direction is determined as an upward inclined direction which rises toward the medium discharge port 26. Therefore, the inclined direction of the straight channel 34B (one direction) corresponds to the discharging direction Y of the print sheet P discharged from the medium discharge port 26.

In the first medium supply channel 31, the print sheet P inserted from an insertion port 36 exposed when a cover 35 provided on one side surface of the printer unit 12 is opened is transported to the recording unit 23. In other words, the print sheet P inserted into the insertion port 36 is pressed against a first drive roller 38*a* by a hopper 37, is transported by a rotation of the first drive roller 38*a*, then is pinched between the first drive roller 38*a* and a first driven roller 38*b*, and then is transported toward the recording unit 23 by the rotation of the first drive roller 38*a*.

The second medium supply channel 32 includes a sheet cassette 39 provided in a bottom portion, which corresponds to a lower side of the printer unit 12 in an insertable/withdrawable manner. The print sheets P mounted in the sheet cassette 39 in a stackable manner are transported to the recording unit 23. In other words, an uppermost print sheet P from the print sheets P mounted in the sheet cassette 39 in a stacked manner is fed by a pickup roller 40, is separated into a piece by a separation roller pair 41, then is pinched between a second drive roller 42*a* and a second driven roller 42*b*, and then is transported toward the recording unit 23 by a rotation of the second drive roller 42*a*.

In the third medium supply channel 33, in the case where both side printing, which is a printing option that prints images on both sheet surfaces (paper surfaces) of the print sheet P, is performed, the print sheet P whereof printing by the recording unit 23 on one sheet surface is terminated is transported again to the recording unit 23. In other words, a divergent transport channel 44 is provided on the downstream side of the recording unit 23 in the transporting direction of the print sheet P. The divergent transport channel 44 is diverged from the medium discharge channel 34 upon an operation of a divergent mechanism 43 provided at the middle of the medium discharge channel 34 is provided. The divergent transport channel 44 is provided with a divergent transport channel roller pair 45 configured to be capable of rotating both in a forward direction and a reverse direction on the downstream side of the divergent mechanism 43.

The print sheet P printed on one of the sheet surfaces on one side is transported from the recording unit 23 toward the mounting base 27 once to the divergent transport channel 44 by the divergent transport channel roller pair 45 rotating in the forward direction for the both side printing. At this time, a part Pe of the print sheet P transported to the divergent transport channel 44 on a leading end side in the transporting direction thereof projects from the medium discharge port 26. Therefore, the position of projection of the print sheet P is set so as not to come into contact with the print sheets P mounted on the mounting base 27 in a stacked manner when projected.

Subsequently, the print sheet P transported to the divergent transport channel 44 is transported reversely in the divergent transport channel 44 from the mounting base 27 side toward the recording unit 23 by the divergent transport channel roller pair 45 rotating in the reverse direction. At this time, the print sheet P transported in the reverse direction is transported to the third medium supply channel 33 and is transported toward the recording unit 23 by the plurality of transport roller pairs 25. The print sheet P is transported to the third medium supply channel 33 and hence is reversed so that the sheet surface which is not printed yet faces the recording unit 23. Then, the reversed print sheet P is pinched between the third drive roller 46*a* and the third driven roller 46*b*, and is transported toward the recording unit 23 by a rotation of the third drive roller 46*a*.

The print sheet P transported in the respective medium supply channels toward the recording unit 23 is transported to a lining-up roller pair 47 disposed on the upstream side of the recording unit 23 in the transporting direction, and then comes into abutment at a leading edge thereof with the lining-up roller pair 47 which has stopped rotating. An inclination of the print sheet P with respect to the transporting direction is corrected (skew correction) by the state in which the print sheet P is in abutment with the lining-up roller pair 47 as described above. The print sheet P corrected in inclination is lined up and is transported toward the recording unit 23 by a subsequent rotation of the lining-up roller pair 47.

The print sheet P transported toward the recording unit 23 by the lining-up roller pair 47 is transported in a state of facing the recording unit 23 by a paper feed roller pair 48 disposed on the upstream side of the recording unit 23 in the transporting direction of the print sheet P, and the paper discharge roller pair 24 and the transport roller pairs 25 disposed on the downstream side thereof in the transporting direction. Ink is ejected onto the transported print sheet P and from the recording unit 23 facing thereto to perform printing.

As illustrated in FIG. 2, a liquid storage unit 50 configured to store ink to be supplied to the recording unit 23 provided in the printer unit 12. In other words, the liquid storage unit 50 supplies ink stored therein to the recording unit 23 via an ink supply channel, which is not illustrated, formed of a tube or the like. The recording unit 23 ejects the supplied ink to print an image or the like on the print sheet P. In this embodiment, the liquid storage unit 50 is arranged on an upper side of the print sheet P mounted on the mounting base 27 in the vertical direction Z. The liquid storage unit 50 is arranged so as to cover at least part of the medium discharge channel 34 when viewing from above in the vertical direction Z.

In other words, the upper side of the medium discharge channel 34, which is a curving and reversing route, has an inclined shape directed in one direction formed by the straight channel 34B continuing from the curved channel 34A. Therefore, a space 12S is formed in the printer unit 12 on an upper side of a portion from above the curved channel 34A to the medium discharge port 26 of the straight channel 34B having the inclined shape.

In this embodiment, the space 12S is formed in the printer unit 12 so as to cover the medium discharge channel 34 in the width direction X when viewing from above. The liquid storage unit 50 is arranged in the space 12S so as to cover at least part of the medium discharge channel 34 when viewing from above. In this embodiment, the liquid storage unit 50 is arranged so as to cover the entire part of the medium discharge channel 34 in the width direction X when viewing from above.

A transport roller pair 25*a* located on the downstream-most side of the medium discharge channel 34 in the transporting direction of the print sheet P among the plurality of transport roller pairs 25 which function as discharge rollers provided in the medium discharge channel 34, is provided in the space 12S at a position overlapping with the liquid storage unit 50 when viewing from a horizontal direction.

In addition, in the space 12S, blast units 57 are provided in a space other than the space occupied by the liquid storage unit 50 at positions on the downstream side of the medium discharge port 26 in the discharging direction Y of the print sheet P. The blast units 57 are configured to blast air in a direction of pressing the print sheet P discharged from the medium discharge port 26 against the mounting surface 28. The blast unit 57 includes a rotary fan 58, and is provided at a position overlapping with the liquid storage unit 50 when viewing from the horizontal direction.

In this embodiment, a pair of the blast units 57 are provided in the width direction X of the print sheet P so that air-outlet ports thereof oppose both ends of the print sheet P in the width direction X with the protruding portion 29 (see FIG. 1) on the mounting surface 28 interposed there between at a center. A configuration in which only one blast unit 57 is provided and the air-outlet port thereof has a shape continuing in the width direction X of the print sheet P is also applicable.

The liquid storage unit 50 includes ink cartridges 51, 52, 53, and 54, which correspond to liquid storage members configured to store a plurality of types (four colors in this case) of ink respectively, and a frame member 55 which allows the respective ink cartridges 51, 52, 53, and 54 to be mounted thereon. The ink cartridges 51, 52, 53, and 54 each are formed into a substantially rectangular parallelepiped shape having a longitudinal direction, and the frame member 55 has a box shape having an opening on one surface thereof. The ink cartridges 51, 52, 53, and 54 are configured to be mounted in the frame member 55 via the opening thereof in an insertable/withdrawable manner. The inserting/withdrawing direction corresponds to the longitudinal direction of the ink cartridges.

In this embodiment, the inserting/withdrawing directions of the ink cartridges 51, 52, 53, and 54 are directions along the width direction X. Therefore, the printer unit 12 includes an aperture, which is not illustrated, which exposes the opening of the frame member 55 when viewing from the width direction X, and a storage unit cover 56 (see FIG. 1) which is capable of opening and closing the aperture. For example, a user of the recording apparatus 11 is allowed to expose the aperture, which is not illustrated, by opening the storage unit cover 56 (see FIG. 1), and insert and withdraw the ink cartridges 51, 52, 53, and 54 with respect to the frame member 55 via the exposed aperture along the width direction X.

In this embodiment, the short direction, the longitudinal direction, and a thickness direction of each of the ink cartridges 51, 52, 53, and 54 are oriented in the vertical direction Z, the width direction X, and the horizontal direction which extends along the discharging direction Y, respectively, in a state in which the ink cartridges 51, 52, 53, and 54 are mounted in the frame member 55. The ink cartridges 51, 52, 53, and 54 have the same length in the short direction (vertical direction Z) and are mounted in the frame member 55 in a line in the thickness direction.

The ink cartridge 54 out of the ink cartridges 51, 52, 53, and 54 is an ink cartridge which stores ink having the highest injection frequency from the recording unit 23 (for example, black) and is arranged at the farthest position from the medium discharge port 26 on the opposite side to the mounting base 27. The ink cartridge 54 is thicker than other ink cartridges 51, 52, and 53 and is capable of storing a larger amount of liquid than the storage amounts of ink in other ink cartridges 51, 52, and 53.

As illustrated in FIG. 2, a rectangular plate-shaped channel forming member 61 is arranged between the recording unit 23 and the mounting base 27 in the printer unit. The channel forming member 61 and the mounting base 27 form part of the third medium supply channel 33, which corresponds to a reversing route configured to reverse the print sheet P. In other words, a lower surface of the mounting base 27 and an upper surface of the channel forming member 61 form the third medium supply channel 33. The channel forming member 61 is inclined so as to be increased in height as it proceeds to the discharging direction Y.

A communication route 62 diverged from an upstream end of the curved channel 34A of the medium discharge channel 34 and extending to the medium transport unit 15 is provided in the printer unit 12. The communication route 62 is provided with a communication transport roller pair 63 configured to transport the print sheet P in the communication route 62 toward the medium transport unit 15. A switching flap 64 is provided at a diverging portion between the medium discharge channel 34 and the communication route 62. The switching flap 64 is capable of switching the route of the print sheet P being transported in the medium discharge channel 34 either toward the curved channel 34A or toward the communication route 62.

The switching flap 64 is configured to be displaced between a position for introducing the print sheet P having been printed by the recording unit 23 and being transported along the medium discharge channel 34 toward the curved channel 34A (a position indicated by a solid line in FIG. 2) and a position for introducing the print sheet P toward the communication route 62 (a position indicated by a two-dot chain line in FIG. 2).

The recording apparatus 11 includes a control unit 65 configured to control the entire recording apparatus 11 in an overall manner.

Next, a configuration of the medium transport unit 15 will be described in detail.

Figure 3:
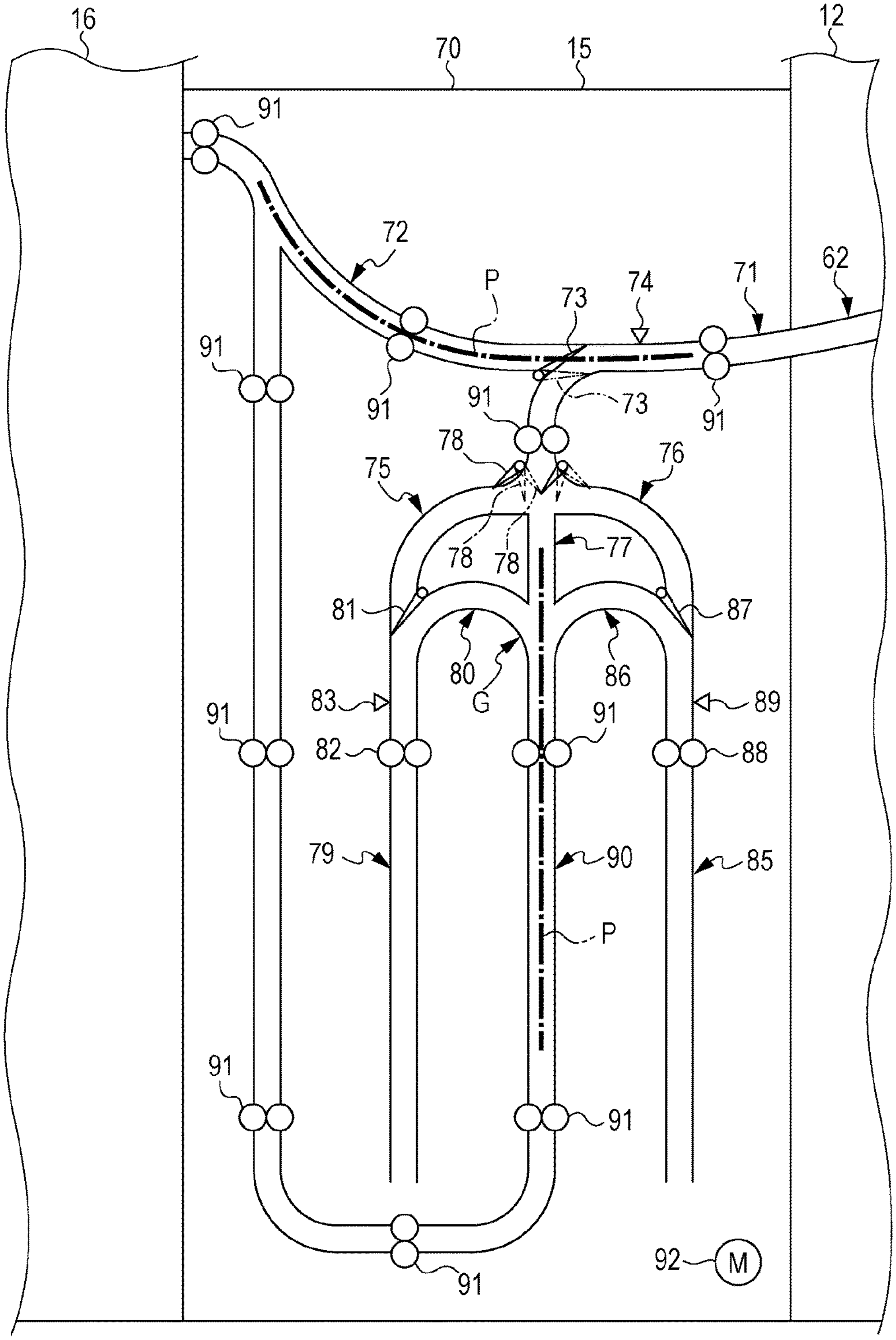
FIG. 3 is a view illustrating a structural frame format of a medium transport unit.

As illustrated in FIG. 3, the medium transport unit 15 is provided with a main body case 70 having parallelepiped shape. An upstream route 71 is provided on an upper portion of the main body case 70 so as to extend from the printer unit 12 side, which corresponds to the upstream side, toward the finisher 16, which corresponds to the downstream side. The upstream route 71 is connected at an upstream end thereof to a downstream end of the communication route 62, and the print sheet P transported from the communication route 62 is transported there through.

A downstream end of the upstream route 71 is curved downward. A skip route 72 is diverged from a beginning of the curve, which corresponds to the midpoint of the upstream route 71 and extends toward the finisher 16. A skip flap 73, which is an example of a skip switching unit configured to selectively switch the route so that the print sheet P in the upstream route 71 is transported either toward the downstream end of the upstream route 71 or toward the skip route 72 is provided at the diverging point to the upstream route 71 and the skip route 72.

The skip flap 73 is configured to displace between a position for introducing the print sheet P in the upstream route 71 toward the downstream end of the upstream route 71 (a position indicated by a solid line in FIG. 3) and a position for introducing the print sheet P toward the skip route 72 (a position indicated by a two-dot chain line in FIG. 3). An upstream sensor 74 configured to detect an end of the print sheet P transported in the upstream route 71 is provided in the upstream route 71 at a position immediately upstream side of the skip flap 73.

An upstream end of a first guide route 75, an upstream end of a second guide route 76, and an upstream end of an intermediate route 77 are connected to the downstream end of the upstream route 71. The first guide route 75 is curved downward while extending from the downstream end of the upstream route 71 toward the finisher 16.

The second guide route 76 is curved downward while extending toward the printer unit 12 from the downstream end of the upstream route 71. The intermediate route 77 extends straight downward from the downstream end of the upstream route 71, and is arranged between the first guide route 75 and the second guide route 76.

A pair of guide flaps 78 as an example of a guide switch unit configured to selectively switch the route so that the print sheet P transported through the upstream route 71 is transported to one of the first guide route 75, the second guide route 76, and the intermediate route 77 is provided at the downstream end of the upstream route 71. The pair of guide flaps 78 are configured to be displaced among a position for introducing the print sheet P in the upstream route 71 to the first guide route 75 (a position indicated by a solid line in FIG. 3), a position for introducing the print sheet P to the second guide route 76 (a position indicated by a two-dot chain line in FIG. 3), and a position for introducing the print sheet P to the intermediate route 77 (a position indicated by a dot-and-dash line in FIG. 3).

An upstream end of a first switchback route 79 is connected to the downstream end of the first guide route 75. Therefore, the first guide route 75 is configured to introduce the print sheet P in the upstream route 71 to the first switchback route 79 arranged on the downstream side of the upstream route 71. The first switchback route 79 extends straight downward from the downstream end of the first guide route 75. The first switchback route 79 is opened at a downstream end thereof, and is configured to be capable of receiving the print sheet P having a maximum printable (recordable) size for the recording unit 23 (see FIG. 2).

An upstream end of a first discharge route 80 from which the print sheet P transported from the first guide route 75 to the first switchback route 79 is discharged is connected to the upstream end of the first switchback route 79, and the downstream end of the first discharge route 80 is connected to the downstream end of the intermediate route 77 so as to join together. The first discharge route 80 has a semi-arc shape protruding toward the guide flaps 78, which correspond to the upper side, and has a length shorter than the first switchback route 79.

A first restriction flap 81 is provided at the downstream end of the first guide route 75. The first restriction flap 81 allows a movement of the print sheet P from the first guide route 75 to the first switchback route 79, but restricts the movement of the print sheet P from the first switchback route 79 to the first guide route 75. The first restriction flap 81 is biased in the direction that closes the downstream end of the first guide route 75 constantly by a biasing force applied by a biasing member, which is not illustrated.

When the print sheet P is transported from the first guide route 75 to the first switchback route 79, the first restriction flap 81 is displaced in the direction that opens the downstream end of the first guide route 75 against a biasing force applied by the biasing member, which is not illustrated, by a force that transports the print sheet P. When the print sheet P is transported from the first switchback route 79 toward the first guide route 75, the print sheet P is introduced to the first discharge route 80 while being restricted to move toward the first guide route 75 by the first restriction flap 81.

A first switchback roller pair 82 configured to be rotatable in both forward and reverse directions is provided in the first switchback route 79 at a position biased to the upstream end from a center portion. Therefore, the first switchback roller pair 82 is configured to be capable of transporting the print sheet P in the both forward and reverse directions. A first switchback sensor 83 is provided in the first switchback route 79 between the first switchback roller pair 82 and the first restriction flap 81. The first switchback sensor 83 is configured to detect the end of the print sheet P being transported in the first switchback route 79.

An upstream end of a second switchback route 85 is connected to the downstream end of the second guide route 76. Therefore, the second guide route 76 is configured to introduce the print sheet P in the upstream route 71 to the second switchback route 85 arranged on the downstream side of the upstream route 71. The second switchback route 85 extends straight downward from the downstream end of the second guide route 76. The second switchback route 85 is opened at a downstream end thereof, and is configured to be capable of receiving the print sheet P having the maximum printable (recordable) size for the recording unit 23 (see FIG. 2).

An upstream end of a second discharge route 86 from which the print sheet P transported from the second guide route 76 to the second switchback route 85 is discharged is connected to the upstream end of a second switchback route 85, and the downstream end of the second discharge route 86 is connected to the downstream end of the intermediate route 77 so as to join together. The second discharge route 86 has a semi-arc shape protruding toward the guide flaps 78, which correspond to the upper side, and has a length shorter than the second switchback route 85. In this embodiment, the first switchback route 79 and the second switchback route 85 have the same length and the first discharge route 80 and the second discharge route 86 have the same length.

A second restriction flap 87 is provided at the downstream end of the second guide route 76. The second restriction flap 87 allows a movement of the print sheet P from the second switchback route 85 to the second guide route 76, but restricts the movement of the print sheet P from the second switchback route 85 to the second guide route 76. The second restriction flap 87 is biased in the direction that closes the downstream end of the second guide route 76 constantly by a biasing force applied by a biasing member, which is not illustrated.

When the print sheet P is transported from the second guide route 76 to the second switchback route 85, the second restriction flap 87 is displaced in the direction that opens the downstream end of the second guide route 76 against a biasing force applied by the biasing member, which is not illustrated, by a force that transports the print sheet P. In contrast, when the print sheet P is transported from the second switchback route 85 toward the second guide route 76, the print sheet P is introduced to the second discharge route 86 while being restricted to move toward the second guide route 76 by the second restriction flap 87.

A second switchback roller pair 88 configured to be rotatable in both forward and reverse directions is provided in the second switchback route 85 at a position biased to the upstream end from a center portion. Therefore, the second switchback roller pair 88 is configured to be capable of transporting the print sheet P in the both forward and reverse directions. A second switchback sensor 89 is provided in the second switchback route 85 between the second switchback roller pair 88 and the second restriction flap 87. The second switchback sensor 89 is configured to detect the end of the print sheet P being transported in the second switchback route 85.

The intermediate route 77, the first discharge route 80, and the second discharge route 86 are joined together at downstream ends thereof, and an upstream end of a downstream route 90 is connected to a junction G thereof. Therefore, the intermediate route 77 connects the downstream end of the upstream route 71 and the upstream end of the downstream route 90.

The downstream route 90 extends straight downward from the junction G so as to pass between the first switchback route 79 and the second switchback route 85, and then U-turns toward the finisher 16 so as to go around the lower side of the downstream end of the first switchback route 79. Subsequently, the downstream route 90 extends straight upward along the finisher 16, joins together with the downstream end of the skip route 72, and is connected at a downstream end thereof to the finisher 16.

As described above, the skip route 72 extending from the midpoint of the upstream route 71 curves gently upward as it proceeds to the downstream end thereof and joins at the downstream end thereof with a downstream end portion (midpoint) of the downstream route 90. Therefore, the skip route 72 is capable of introducing the print sheet P in the upstream route 71 to the downstream route 90 without passing through the intermediate route 77, the first discharge route 80, and the second discharge route 86. A plurality of transport roller pairs 91 capable of transporting the print sheet P are arranged in the upstream route 71, the skip route 72, and the downstream route 90 at proper intervals.

As illustrated in FIG. 2 and FIG. 3, the plurality of transport roller pairs 91, the first switchback roller pair 82, the second switchback roller pair 88, and the communication transport roller pair 63 are configured to be driven to rotate upon a transmission of a drive force from a motor 92 arranged in the main body case 70 via an electric clutch, which is not illustrated. In addition, the skip flap 73, the pair of guide flaps 78, and the switching flap 64 are configured to be displaced upon a transmission of a drive force from the motor 92 via the electric clutch, which is not illustrated.

The upstream sensor 74, the first switchback sensor 83, the second switchback sensor 89, the motor 92, and the above-described electric clutch (not illustrated) are electrically connected to the control unit 65. The control unit 65 drives and controls the motor 92 and the above-described electric clutch (not illustrated) on the basis of signals transmitted from the upstream sensor 74, the first switchback sensor 83, and the second switchback sensor 89.

The postprocessing to be performed by the finisher 16 includes sorting, folding, stapling, punching, and aligning that aligns the ends of the printed print sheets P sequentially transported from the medium transport unit 15. A finisher configured to perform at least one of the above-described processes may also be provided.

An operation to be effected when reversing the print sheet P printed by the recording unit 23 and transporting the same to the finisher 16 with the medium transport unit 15 will be described below.

As illustrated in FIG. 2 and FIG. 3, the print sheet P printed by the recording unit 23 is transported toward downstream along the medium discharge channel 34 in a state in which the recording surface (printing surface) faces upward. At this time, the switching flap 64 is displaced to a position for opening an upstream end side of the communication route 62, whereby the print sheet P in the medium discharge channel 34 is introduced into the communication route 62 by the switching flap 64.

The print sheet P introduced to the communication route 62 is transported by the communication transport roller pair 63 to the upstream route 71 of the medium transport unit 15 along the communication route 62. In the description given below, P1 is a first print sheet out of the print sheets P to be sequentially transported to the upstream route 71 and, in the same manner, P2 is a second print sheet, P3 is a third print sheet, and P4 is a fourth print sheet.

As illustrated in FIG. 3, when the skip flap 73 is displaced to a position for closing the upstream end side of the skip route 72, the first print sheet P1 transported to the upstream route 71 is introduced to the downstream end of the upstream route 71 by the skip flap 73. At this time, since the pair of guide flaps 78 are displaced to positions for introducing the print sheet P1 in the upstream route 71 to the first guide route 75, the print sheet P1 in the upstream route 71 passes through the first guide route 75 and is transported to the first switchback route 79 as illustrated in FIG. 4A.

Subsequently, when the print sheet P1 passes over the upstream route 71, the second print sheet P2 is transported to the upstream route 71, and the pair of guide flaps 78 are displaced to positions for introducing the print sheet P2 in the upstream route 71 to the second guide route 76. Subsequently, as illustrated in FIG. 4B, the print sheet P1 is transported to the first switchback route 79 by the first switchback roller pair 82 rotating forward, and when a trailing edge of the print sheet P1 in a direction of travel is detected by the first switchback sensor 83, the first switchback roller pair 82 is rotated reversely. At this time, the print sheet P2 is transported from the upstream route 71 to the second guide route 76.

Figure 4C:
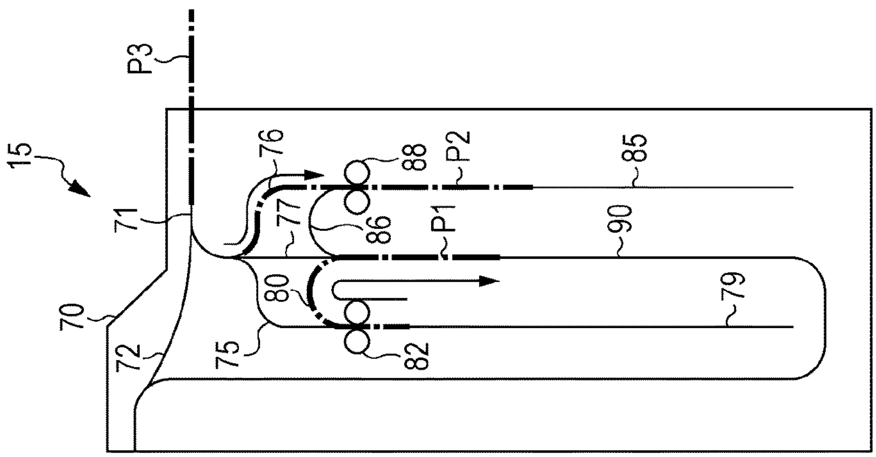
FIGS. 4A to 4C are schematic drawings illustrating states of transporting a print sheet with the medium transport unit.
Figure 4B:
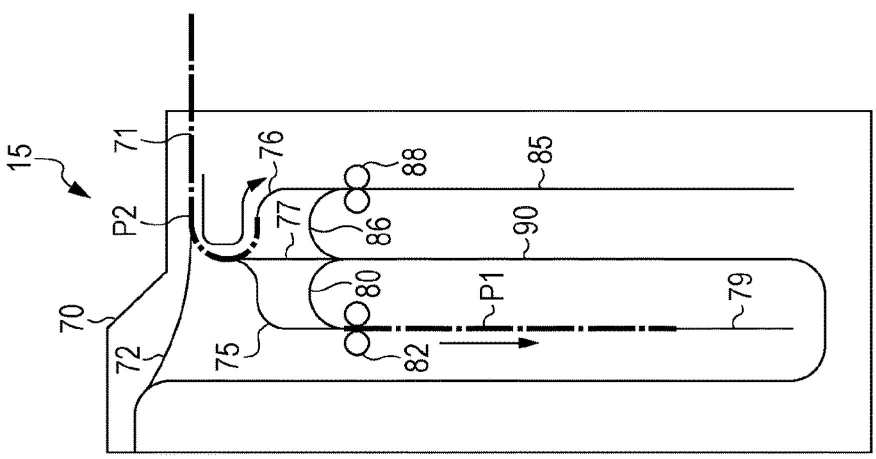
Figure 4A:
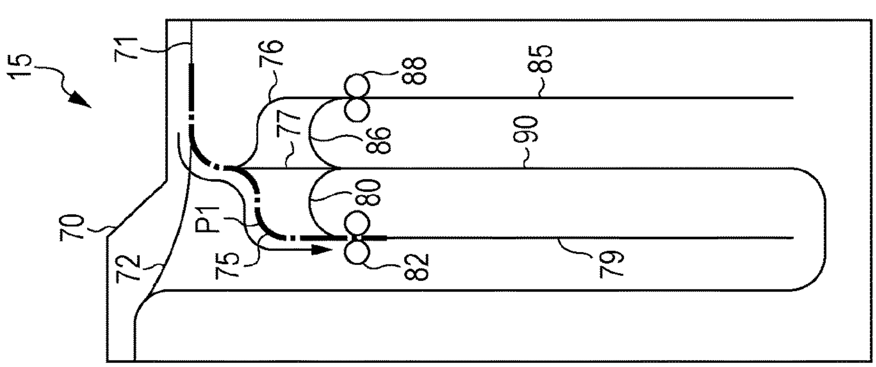

Subsequently, as illustrated in FIG. 4C, when the print sheet P2 passes over the upstream route 71, the third print sheet P3 is transported to the upstream route 71, and the pair of guide flaps 78 are displaced to positions for introducing the print sheet P3 in the upstream route 71 to the first guide route 75. In contrast, when the first switchback roller pair 82 are rotated reversely, the print sheet P1 in the first switchback route 79 passes through the first discharge route 80 and is transported to the downstream route 90. In this transport process, the print sheet P1 is reversed. At this time, the print sheet P2 transported to the second guide route 76 is transported to the second switchback route 85 by the second switchback roller pair 88 rotating forward.

Figure 5B:
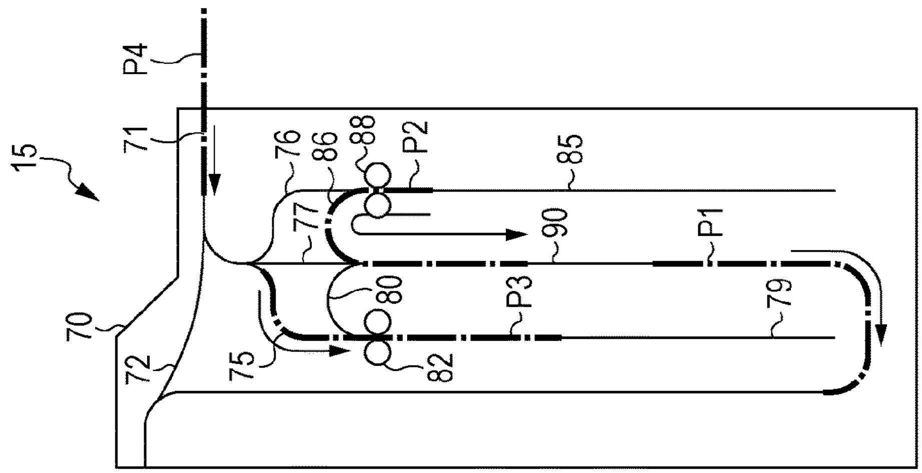
FIGS. 5A and 5B are schematic drawings illustrating states of transporting a print sheet with the medium transport unit.
Figure 5A:
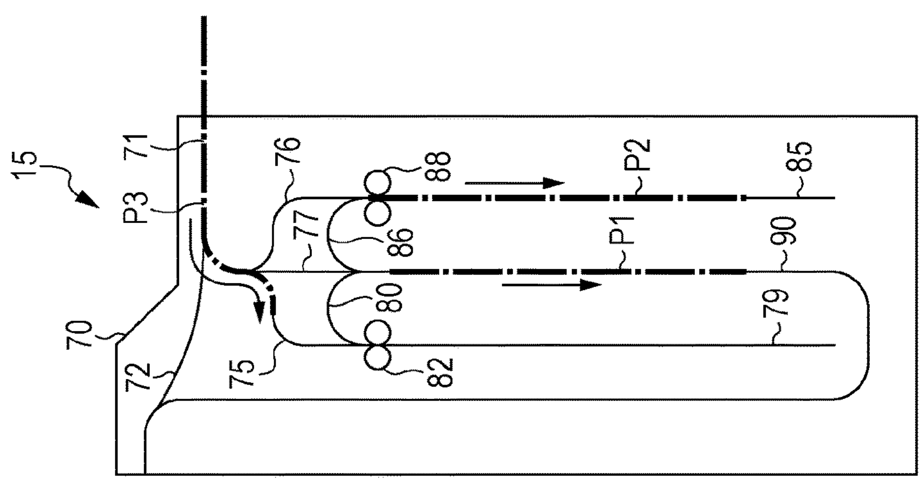

Subsequently, as illustrated in FIG. 5A, the print sheet P2 is transported to the second switchback route 85 by the second switchback roller pair 88 rotating forward, and when a trailing edge of the print sheet P2 in the direction of travel is detected by the second switchback sensor 89, the second switchback roller pair 88 is rotated reversely. At this time, the print sheet P3 is transported from the upstream route 71 to the first guide route 75, and the print sheet P1 is transported downstream side along the downstream route 90.

Subsequently, as illustrated in FIG. 5B, when the print sheet P3 passes over the upstream route 71, the fourth print sheet P4 is transported to the upstream route 71, and the pair of guide flaps 78 are displaced to positions for introducing the print sheet P4 in the upstream route 71 to the second guide route 76. In contrast, when the second switchback roller pair 88 are rotated reversely, the print sheet P2 in the second switchback route 85 passes through the second discharge route 86 and is transported to the downstream route 90. In this transport process, the print sheet P2 is reversed.

At this time, the print sheet P3 transported to the first guide route 75 is transported to the first switchback route 79 by the first switchback roller pair 82 rotating forward. Furthermore, at this time, the print sheet P1 is transported further downstream side along the downstream route 90.

In this manner, the print sheet P printed by the recording unit 23 is reversed by the medium transport unit 15 and is sequentially transported to the finisher 16 in a state in which the recording surface faces downward. Subsequently, the print sheets P are sorted, folded, stapled, punched or aligned by the finisher 16.

In the case where the print sheet P printed by the recording unit 23 is not reversed by the medium transport unit 15, but is transported to the finisher 16 as illustrated in FIG. 3, transport of the print sheet P is performed in a state in which the pair of guide flaps 78 are displaced to positions for introducing the print sheet P in the upstream route 71 to the intermediate route 77. In other words, the print sheet P transported to the upstream route 71 is transported to the finisher 16 passing through the intermediate route 77 and the downstream route 90. In this configuration, even a printed print sheet P which does not have to be reversed is transported along the intermediate route 77 and the downstream route 90, so that a natural drying time for the paper P is ensured.

In addition, in the case where the print sheet P printed by the recording unit 23 is rapidly transported to the finisher 16 by the medium transport unit 15 as illustrated in FIG. 3, transport of the print sheet P is performed in a state in which the skip flap 73 is displaced to the position for opening the upstream end side of the skip route 72. In other words, the print sheet P transported to the upstream route 71 is transported to the finisher 16 passing through the skip route 72 and a downstream end portion (part) of the downstream route 90. In this case, since the skip route 72 simply curves gently upward toward the downstream end thereof, this configuration is convenient for the case where the medium can hardly be curved significantly such as a thick paper.

According to the embodiment described in detail thus far, the following advantageous effects are achieved.

(1) In the medium transport unit 15, the downstream route 90 passes between the first switchback route 79 and the second switchback route 85, and the upstream end thereof is connected to the junction G of the downstream ends of the first discharge route 80 and the second discharge route 86. In addition, the length of the first discharge route 80 is shorter than the length of the first switchback route 79, and the length of the second discharge route 86 is shorter than the length of the second switchback route 85. Therefore, since the lengths of the first discharge route 80 and the second discharge route 86 may be reduced compared with those in the related art, and hence the medium transport unit 15 can be reduced in size.

(2) The medium transport unit 15 includes the skip route 72 diverged from the midpoint of the upstream route 71, joined to the downstream end portion of the downstream route 90, and configured to introduce the print sheet P in the upstream route 71 to the downstream end of the downstream route 90, and the skip flap 73 configured to selectively switch the route so that the print sheet P in the upstream route 71 is transported either toward the downstream end of the upstream route 71 or toward the skip route 72.

Therefore, by switching the skip flap 73 toward the skip route 72 side, the print sheet P in the upstream route 71 can be transported rapidly through the skip route 72 to the downstream end portion of the downstream route 90 without passing through the intermediate route 77, the first discharge route 80, and the second discharge route 86.

(3) The medium transport unit 15 is provided with the intermediate route 77 configured to connect the downstream end of the upstream route 71 and the upstream end of the downstream route 90, and the pair of guide flaps 78 are configured to selectively switch the route so that the print sheet P transported through the upstream route 71 is transported to one of the first guide route 75, the second guide route 76, and the intermediate route 77. Therefore, by switching the pair of guide flaps 78 toward the intermediate route 77, the print sheet P in the upstream route 71 can be rapidly transported to the upstream end of the downstream route 90 through the intermediate route 77 without passing through the first guide route 75 and the second guide route 76.

(4) In the medium transport unit 15, the length of the first guide route 75 is shorter than the length of the first switchback route 79, and the length of the second guide route 76 is shorter than the length of the second switchback route 85. Therefore, since the lengths of the first guide route 75 and the second guide route 76 may be reduced compared with those in the related art, the medium transport unit 15 can be reduced in size.

(5) The recording apparatus 11 includes the recording unit 23 configured to perform printing on the print sheet P, and the medium transport unit 15, and the first switchback route 79 and the second switchback route 85 are each configured to be capable of receiving the print sheet P having the maximum printable size for the recording unit 23. Therefore, the print sheet P can be reliably received by the first switchback route 79 and the second switchback route 85 as long as printing on the print sheet P by the recording unit 23 is possible.

(6) The recording unit 23 includes a line head capable of ejecting ink on the print sheet P transported at a high speed simultaneously over the substantially entire area in the width direction X at a lower portion thereof. Therefore, the high-speed printing is enabled. However, since the print sheet P absorbs ink over a wide surface area in a short time, the print sheet P tends to be curled in a wave shape in cross section.

If the print sheet P is curled, the print sheet P may jam in the course of the transporting route or the post-processing such as sorting and folding may not be performed in the finisher 16. In this embodiment, with the provision of the medium transport unit 15, the printed print sheet P is dried while being transported in the transporting route provided in the medium transport unit 15, and curled shape of the print sheet P is disappeared and an original shape may be restored.

Modification

The above-described embodiment may be modified as follows.

Figure 6:
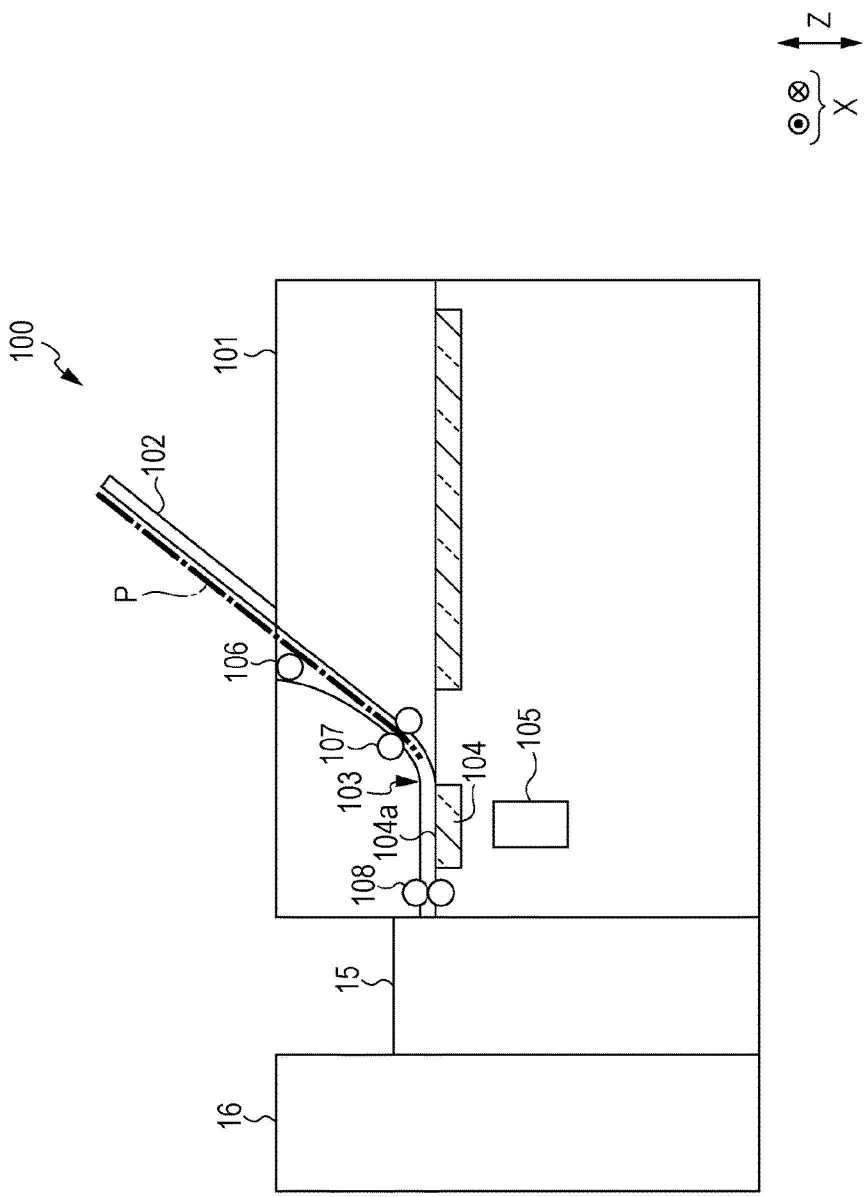
FIG. 6 is a view illustrating a structural frame format of an image reading apparatus.

As illustrated in FIG. 6, the medium transport unit 15 may be provided on an image reading apparatus 100 configured to read an image on the print sheet P. In other words, the image reading apparatus 100 includes a scanner unit 101 configured to read the image on the print sheet P, the medium transport unit 15 arranged on the side portion of the scanner unit 101, and the finisher 16 arranged on the medium transport unit 15 on a side portion provided on a side opposite to the scanner unit 101 side. The scanner unit 101 includes a tray 102 on which print sheets P are set, a transporting route 103 configured to transport the print sheets P set on the tray 102 to the upstream route 71 (see FIG. 3) of the medium transport unit 15, and a no-color transparent glass plate 104 arranged at a midpoint of the transporting route 103 and forming a read surface 104*a* where an image on the print sheet P is read. A reader 105 configured to read the image on the print sheet P passing over the read surface 104*a* through the glass plate 104 is arranged at a position right under the glass plate 104. The transporting route 103 includes a paper feed roller 106 configured to feed the print sheet P set on the tray 102, a paper feed roller pair 107 configured to feed the print sheet P fed by the paper feed roller 106 onto the read surface 104*a*, and a paper discharge roller pair 108 configured to discharge the print sheet P on the read surface 104*a* to the medium transport unit 15. The first switchback route 79 and the second switchback route 85 of the medium transport unit 15 are opened at the downstream ends thereof so as to be capable of receiving the print sheet P having a maximum readable size for the reader 105. In this configuration, the print sheet P can be reliably received by the first switchback route 79 and the second switchback route 85 as long as the print sheet P can be read by the reader 105 is possible. In addition, the image reading apparatus 100 configured as described above is convenient in the case of, for example, reading a plurality of the print sheets P (originals) which are stapled, and then stapling the print sheets P again. In other words, by removing the staple once and setting the plurality of print sheets P on the tray 102 of the image reading apparatus 100, the plurality of print sheets P are sequentially transported to the finisher 16 by the medium transport unit 15 after the images on the plurality of print sheets P have sequentially been read by the reader 105, and then are stapled again.

In the medium transport unit 15, the intermediate route 77 may be omitted.

In the medium transport unit 15, the skip route 72 may be omitted.

In the medium transport unit 15, the length of the first discharge route 80 may be longer than the length of the first switchback route 79.

In the medium transport unit 15, the length of the second discharge route 86 may be longer than the length of the second switchback route 85.

In the medium transport unit 15, the length of the first guide route 75 may be longer than the length of the first switchback route 79.

In the medium transport unit 15, the length of the second guide route 76 may be longer than the length of the second switchback route 85.

In the medium transport unit 15, part of the print sheet P may be protruded from opened downstream ends (lower ends) of the first switchback route 79 and the second switchback route 85 when the print sheet P is received in the first switchback route 79 and the second switchback route 85.

In the medium transport unit 15, the length of the first switchback route 79 and the second switchback route 85 may be different from each other.

In the medium transport unit 15, the first discharge route 80 and the second discharge route 86 may be different lengths from each other.

Figure 7A:
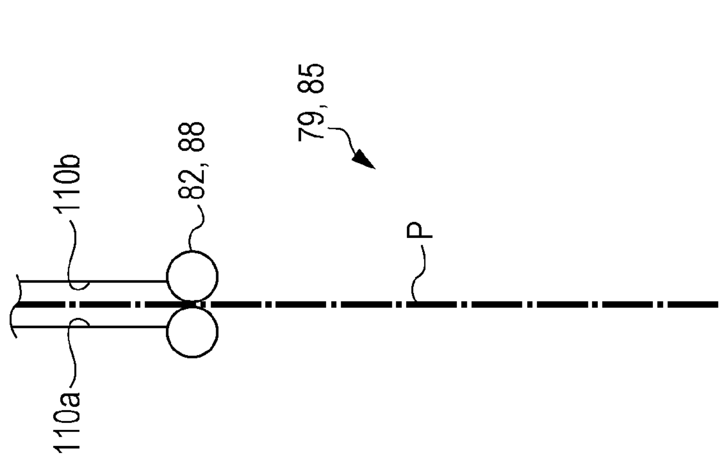
FIGS. 7A to 7C are structural frame formats illustrating a first switchback route and a second switchback route.

The first switchback route 79 and the second switchback route 85 each may be configured to include a space area. The first switchback route 79 and the second switchback route 85 illustrated in FIG. 7A each include guide surfaces 110*a* and 110*b* facing each other on the upstream side of the first switchback roller pair 82 and the second switchback roller pair 88 and have no guide surface on the downstream side thereof but have a space area. When the first switchback roller pair 82 and the second switchback roller pair 88 pinch the print sheet P and rotate in the forward direction or in the reverse direction, the print sheet P is transported in a state in which the downstream side of the print sheet P hangs therefrom. In this configuration, a member having the guide surface is not required, and hence the medium transport unit 15 may be reduced in size.

Figure 7B:
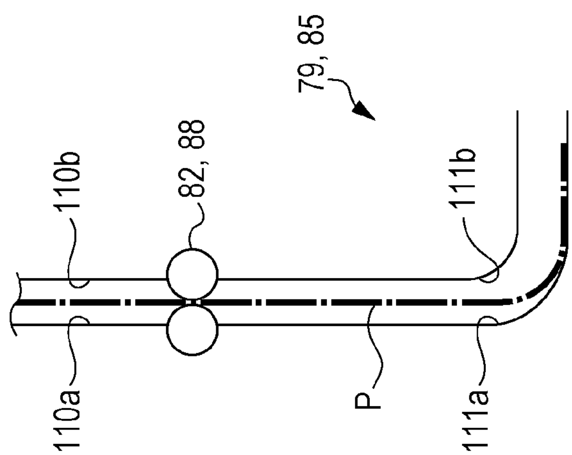

The first switchback route 79 and the second switchback route 85 each may be configured to include a curved route. The first switchback route 79 and the second switchback route 85 illustrated in FIG. 7B each include guide surfaces 111*a* and 111*b* curved and facing each other on the downstream side of the first switchback roller pair 82 and the second switchback roller pair 88. When the first switchback roller pair 82 and the second switchback roller pair 88 pinch the print sheet P and rotate in the forward direction or in the reverse direction, the print sheet P is transported in a state in which the downstream side of the print sheet P is curved. In this configuration, the length of the medium transport unit 15 in vertical direction of the drawing may be reduced.

The first switchback route 79 and the second switchback route 85 may each have a roller at a downstream end thereof to cause the downstream side of the print sheet to curve along an outer peripheral surface of the roller. The first switchback route 79 and the second switchback route 85 in FIG. 7C include guide surfaces 112*a* and 112*b* extending downward and facing each other on the downstream side of the first switchback roller pair 82 and the second switchback roller pair 88, and each include a roller 114 located at a position below the guide surface 112*b* and configured to be rotatable, and guide surface 113 connected to the guide surface 112*a* and curved along the outer peripheral surface of the roller 114.

Figure 7C:
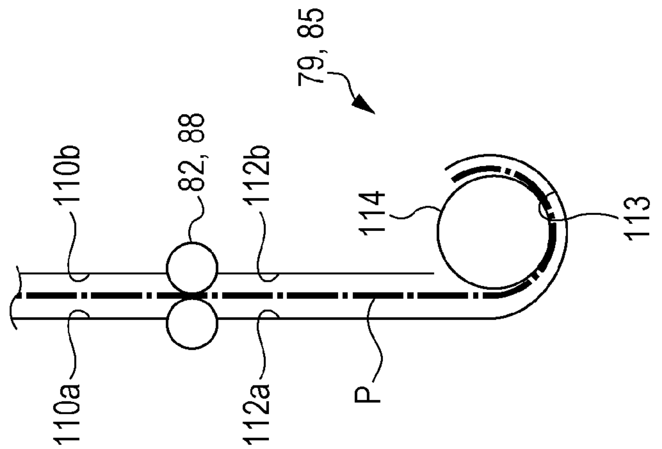

As illustrated in FIG. 7C, when the first switchback roller pair 82 and the second switchback roller pair 88 each pinch the print sheet P and rotate in a direction in which the print sheet P moves to the downstream side, the print sheet P is transported with the downstream side thereof being wound around the outer peripheral surface of the roller 114. When the first switchback roller pair 82 and the second switchback roller pair 88 each rotate in a direction in which the print sheet P moves toward the upstream side, the print sheet P is transported with the downstream side thereof being wound around the outer peripheral surface of the roller 114.

A configuration in which the roller 114 is rotated in conjunction with timing of rotation of each of the first switchback roller pair 82 and the second switchback roller pair 88 is also applicable. In this configuration, the length of the medium transport unit 15 in a lateral direction of the drawing may be reduced.

Figure 8:
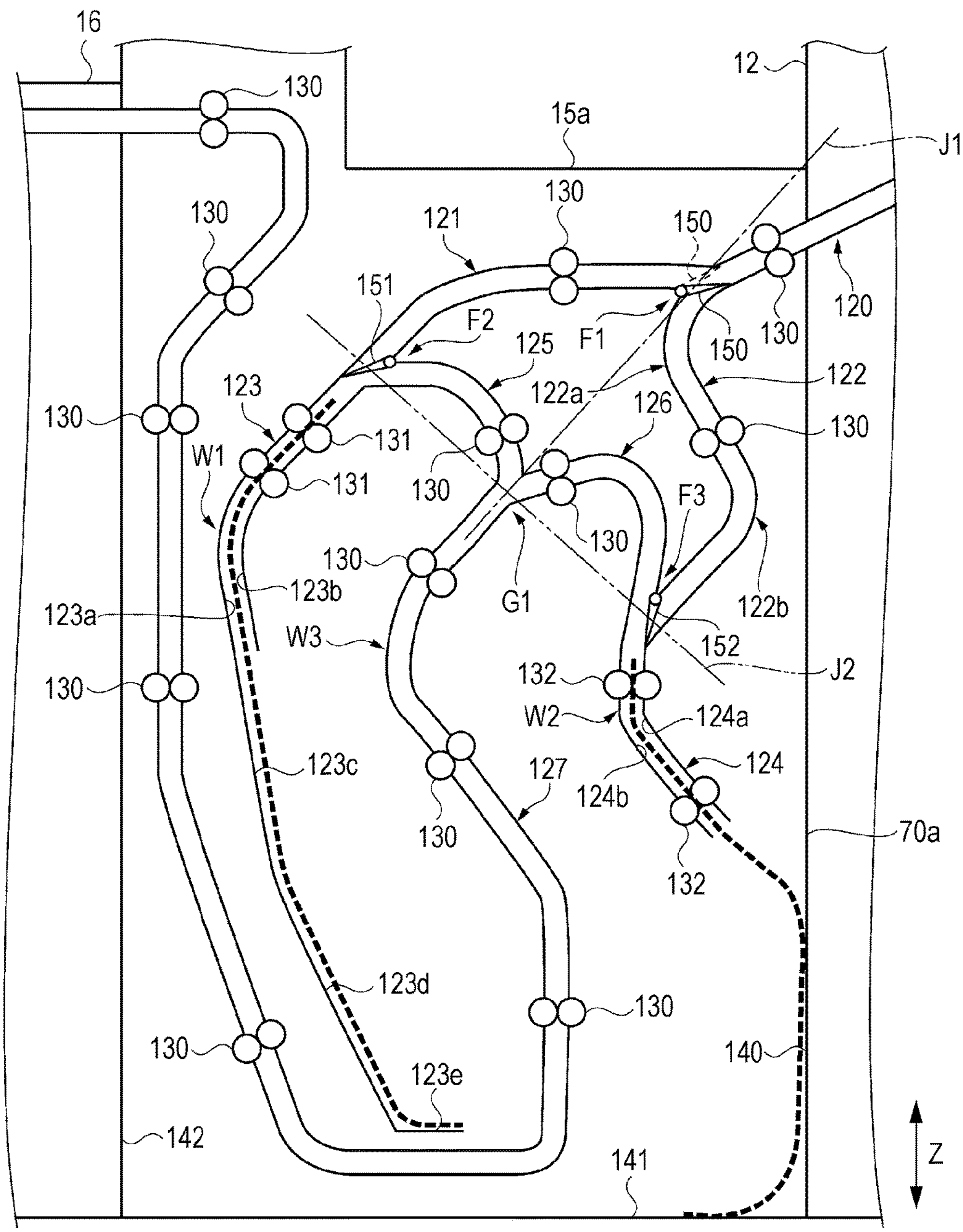
FIG. 8 is a view illustrating a structural frame format of the medium transport unit.

FIG. 8 is a view illustrating a structural frame format of a medium transport unit 15*a* when viewing in the width direction X. The first guide route 75 and the second guide route 76 illustrated in FIG. 3 are arranged so as to overlap entirely with the first discharge route 80 and the second discharge route 86, respectively, in the vertical direction Z. However, a first guide route 121 and the second guide route 122 may be arranged so as to partly overlap with a first discharge route 125 and a second discharge route 126, respectively, in the vertical direction Z as illustrated in FIG. 8.

An upstream route 120 is arranged from the printer unit 12 to the medium transport unit 15*a*, and is arranged so as to be inclined downward as it proceeds to the downstream side in the transporting direction. The upstream route 120 is diverged to the first guide route 121 and the second guide route 122 at a diverging point F1, which corresponds to a downstream end of the upstream route 120.

The first guide route 121 is diverged to a first switchback route 123 and the first discharge route 125 at a diverging point F2, which corresponds to a downstream end of the first guide route 121. In the same manner, the second guide route 122 is diverged to a second switchback route 124 and the second discharge route 126 at a diverging point F3, which corresponds to a downstream end of the second guide route 122. The first discharge route 125 and the second discharge route 126 join together on the downstream side thereof at a junction G1 and are connected to a downstream route 127.

The upstream route 120, the first guide route 121, the second guide route 122, the first discharge route 125, the second discharge route 126, and the downstream route 127 are each provided with a transport roller pair 130 configured to transport a print sheet to the downstream side thereof. The first switchback route 123 and the second switchback route 124 are provided with switchback roller pairs 131 and 132 configured to be capable of transporting the print sheet while switching the transporting direction to the downstream side or to the upstream side, respectively.

A guide flap 150 that functions as a guide switch unit is provided at the diverging point F1 so as to be pivotable as indicated by a solid line and a broken line to guide a print sheet (not illustrated) transported from the upstream side to the first guide route 121 or the second guide route 122.

A first restriction flap 151 and a second restriction flap 152 are provided at the diverging points F2 and F3, respectively. The first restriction flap 151 and the second restriction flap 152 are biased constantly in directions that closes the downstream ends of the first guide route 121 and the second guide route 122, respectively, by a biasing force applied by a biasing member, which is not illustrated.

When the print sheet is transported from the first guide route 121 to the first switchback route 123, the first restriction flap 151 is displaced in a direction that opens the downstream end of the first guide route 121 against a biasing force applied by the biasing member by a force that transports the print sheet. In contrast, when the print sheet is transported from the first switchback route 123 toward the first guide route 121, the print sheet is introduced into the first discharge route 125 while restricting the print sheet from moving to the first guide route 121 by the first restriction flap 151.

In the same manner, when the print sheet is transported from the second guide route 122 to the second switchback route 124, the second restriction flap 152 is displaced in the direction that opens the downstream end of the second guide route 122 against a biasing force applied by the biasing member by the force that transports the print sheet. In contrast, when the print sheet is transported from the second switchback route 124 toward the second guide route 122, the print sheet is introduced to the second discharge route 126 while restricting the print sheet from moving to the second guide route 122 by the second restriction flap 152.

The first guide route 121 has a curved shape protruding upward. An upper portion of the second guide route 122 has a curved shape protruding toward the finisher 16, and a lower portion of the second guide route 122 has a curved shape protruding toward the printer unit 12. In other words, the second guide route 122 is arranged so that the shape viewed from the width direction X is curved into an S shape.

The first guide route 121 is arranged so as to overlap partly with the first discharge route 125 in the vertical direction Z. In the same manner, the second guide route 122 is arranged so as to overlap partly with the second discharge route 126 in the vertical direction Z.

The diverging point F1 is located at a position biased to the printer unit 12 above the position of the junction G1.

The diverging point F2 is located at a position above the diverging point F3 on the finisher 16 side.

Therefore, as indicated by a dot-and-dash line J1 that connects the diverging point F1 and the junction G1 and a two-dot chain line J2 that connects the diverging point F2 and the diverging point F3, a configuration of a closed circular route formed by the first guide route 121, the second guide route 122, the first discharge route 125, and the second discharge route 126 has an inclined shape in the vertical direction Z as a whole.

The first switchback route 123 is formed on the downstream side of the diverging point F2, and includes guide surfaces 123*a* and 123*b* facing each other and guide surfaces 123*c*, 123*d*, and 123*e* formed continuously on the downstream side of the guide surface 123*a*. The surface facing the guide surfaces 123*c*, 123*d*, and 123*e* is not provided, the guide surfaces 123*c* and 123*d* are opened on the printer unit 12 side, and the guide surface 123*e* is opened on the upper side. The length of the first switchback route 123 is longer than the lengths of the first guide route 121 and the first discharge route 125.

The print sheet is guided by the guide surfaces 123*a* and 123*b* facing each other in the upper portion of the first switchback route 123, and is guided by the guide surfaces 123*c*, 123*d*, and 123*e* having different angle of inclination in the vertical direction Z in the lower portion of the first switchback route 123. Therefore, the print sheet transported by the switchback roller pair 131 is bent as indicated by a broken line.

The second switchback route 124 is formed on the downstream side of the diverging point F3 and includes guide surfaces 124*a* and 124*b* facing each other, and the print sheet transported by a switchback roller pair 132 is guided thereby. The print sheet longer than the guide surfaces 124*a* and 124*b* is bent as indicated by a broken line along an inner side surface 140 and an inner bottom surface 141 of a main body case 70*a* in a state of being pinched by the switchback roller pair 132. Therefore, when a long print sheet is transported by the switchback roller pair 132, the inner side surface 140 and the inner bottom surface 141 function as the guide surfaces in the second switchback route 124.

The downstream route 127 passes from the junction G1 between the first switchback route 123 and the second switchback route 124, and U-turns upward so as to go around the lower side of the first switchback route 123. The downstream route 127 extends straight upward along an inner side surface 142 of the main body case 70*a*, protrudes toward the printer unit 12 and curved, and then is arranged so as to be directed toward the finisher 16.

The first switchback route 123, the second switchback route 124, and the downstream route 127 include curved portions W1, W2, and W3 protruding in the same direction (toward the finisher 16).

The printer unit 12, the finisher 16, and an enclosure (housing) of the medium transport units 15 and 15*a* may be configured integrally or may be configured to be separable.

With the configuration of the transporting route provided in the medium transport unit 15*a* as described with reference to FIG. 8 thus far, the length of the transporting route in the vertical direction Z and the transporting direction are reduced to restrict an increase in size of the recording apparatus.

The medium may be only the print sheets P, but also cloth and plastic films.

In the embodiment described above, the recording apparatus 11 may be a fluid ejecting apparatus configured to perform recording by ejecting and discharging fluids other than ink (including liquids, liquid-state materials formed by a liquid with particles of a functional material dispersed or mixed therein, flowing-state materials such as gel, and solids that can be flowed and ejected as a fluid). For example, a liquid-state material ejecting apparatus configured to perform recording by ejecting a liquid-state material including materials such as electrode materials or color materials (pixel materials) used for manufacturing liquid-crystal displays, EL (electro luminescence) displays, and surface-emitting displays in a form of dispersion or dissolution. Also, a flowing-state material ejecting apparatus configured to eject a flowing-state material such as gel (for example, physical gel).

The invention may be applied to one of these fluid ejection apparatuses. The term “fluid” in the specification is an idea not including fluids composed only of gas, and the fluid includes, for example, liquids (including inorganic solvent, organic solvent, solution, liquid-state resin, liquid-state metal (metallic melt) and the like), liquid-state materials and flowing-state materials.

This application is a continuation application of U.S. patent application Ser. No. 15/237,366 filed Aug. 15, 2016, which is a continuation of U.S. patent application Ser. No. 14/920,639, filed Oct. 22, 2015, which issued as U.S. Pat. No. 9,442,448 on Sep. 13, 2016, which patent applications are incorporated herein by reference in their entireties. U.S. patent application Ser. No. 14/920,639 claims the benefit of and priority of Japanese Patent Application Nos.: 2014-217046, filed Oct. 24, 2014 and 2015-065903, filed Mar. 27, 2015 are expressly incorporated by reference herein.

What is claimed is:

1. A medium transporting mechanism comprising:

an upstream route configured to transport a recorded medium that is recorded upon by a recording head configured to discharge droplets, a first switchback route configured to switch back the recorded medium transported from the upstream route, a first guide route configured to transport the recorded medium from the upstream route to the first switchback route, a first upstream reversing route configured to reverse and transport the recorded medium switched back from the first switchback route, and a downstream reversing route configured to continue reversing and transporting the recorded medium transported from the first upstream reversing route, wherein the first switchback route extends in a first direction, wherein the downstream reversing route extends in the first direction and then reverses and extends in a second direction opposite to the first direction, and wherein the recorded medium is transported by the downstream reversing route, transported to a post-processing section that executes post-processing on the recorded medium.

2. A medium transporting mechanism according to claim 1, wherein the downstream reversing route extends in the second direction bypassing the first switchback route.

3. A medium transporting mechanism according to claim 2, further comprising:

a second switchback route configured to switch back the recorded medium transported from the upstream route, a second guide route configured to transport the recorded medium from the upstream route to the second switchback route, a guide switch configured to selectively switch the route so that the recorded medium is transported through the upstream route transporting to one of the first switch back route and the second switch back route, and a second upstream reversing route configured to continue reversing and transporting the recorded medium switched back from the second switchback route, wherein the second switchback route extends in the first direction.

4. A medium transporting mechanism according to claim 3, wherein the downstream reversing route extends in the second direction bypassing either the first switchback route or the second switchback route.

5. A recording apparatus comprising:

the medium transporting mechanism according to claim 1.

6. A post processing apparatus comprising:

a post processing section configured to performing post processing on the recorded medium, and the medium transporting mechanism according to claim 1.

7. A recording apparatus comprising:

an upstream route configured to transport a recorded medium that is recorded upon by a recording head configured to discharge droplets, a first switchback route configured to switch back the recorded medium transported from the upstream route, a first guide route configured to transport the recorded medium from the upstream route to the first switchback route, a first upstream reversing route configured to reverse and transport the recorded medium switched back from the first switchback route, and a downstream reversing route configured to continue reversing and transporting the recorded medium transported from the first upstream reversing route, wherein the first switchback route extends in a first direction, wherein the downstream reversing route extends in the first direction and then reverses and extends in a second direction opposite to the first direction, and wherein the recorded medium is transported by the downstream reversing route, transported to a post-processing section that executes post-processing on the recorded medium.

8. A post processing apparatus comprising:

a post processing section configured to perform post processing on a recorded medium, and a medium transporting mechanism comprising:

an upstream route configured to transport a recorded medium that is recorded upon by a recording head configured to discharge droplets, a first switchback route configured to switch back the recorded medium transported from the upstream route, a first guide route configured to transport the recorded medium from the upstream route to the first switchback route, a first upstream reversing route configured to reverse and transport the recorded medium switched back from the first switchback route, and a downstream reversing route configured to continue reversing and transporting the recorded medium transported from the first upstream reversing route, wherein the first switchback route extends in a first direction, wherein the downstream reversing route extends in a first direction and then reverses and extends in a second direction opposite to the first direction, and wherein the recorded medium is transported by the downstream reversing route, transported to the post-processing section.

* * * * *